United States Patent

Schmieder et al.

(10) Patent No.: US 9,471,194 B2
(45) Date of Patent: Oct. 18, 2016

(54) RENDERING WINDOWS HAVING TRANSPARENT PROPERTIES FROM A REMOTE DESKTOP ENVIRONMENT

(71) Applicant: Microsoft Technology Licensing, LLC, Redmond, WA (US)

(72) Inventors: Robert Wilhelm Schmieder, Snoqualmie, WA (US); Oreste Dorin Ungureanu, Duvall, WA (US); Nadim Abdo, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 183 days.

(21) Appl. No.: 14/168,239

(22) Filed: Jan. 30, 2014

(65) Prior Publication Data

US 2015/0121243 A1 Apr. 30, 2015

Related U.S. Application Data

(60) Provisional application No. 61/897,129, filed on Oct. 29, 2013.

(51) Int. Cl.
*G06F 3/0481* (2013.01)
*G06F 9/44* (2006.01)

(52) U.S. Cl.
CPC .......... *G06F 3/0481* (2013.01); *G06F 9/4445* (2013.01); *G06F 2203/04804* (2013.01)

(58) Field of Classification Search
CPC ............. G06F 3/0481; G06F 3/04815; G06F 2203/04804; G06F 9/4445
See application file for complete search history.

(56) References Cited

U.S. PATENT DOCUMENTS

| | | | |
|---|---|---|---|
| 6,369,830 B1 * | 4/2002 | Brunner | G06T 15/40 345/619 |
| 6,542,165 B1 * | 4/2003 | Ohkado | G06F 3/0481 715/210 |
| 7,213,228 B2 | 5/2007 | Putterman et al. | |
| 8,774,536 B1 * | 7/2014 | Jia | G06F 9/4445 382/232 |
| 2005/0102321 A1 | 5/2005 | David et al. | |
| 2006/0129634 A1 | 6/2006 | Khouzam et al. | |
| 2007/0079244 A1 | 4/2007 | Brugiolo | |
| 2008/0238929 A1 | 10/2008 | Abdo et al. | |
| 2008/0244458 A1 | 10/2008 | Brugiolo et al. | |
| 2011/0138295 A1 | 6/2011 | Momchilov et al. | |
| 2011/0320944 A1 | 12/2011 | Nikara et al. | |
| 2012/0226742 A1 | 9/2012 | Momchilov et al. | |

* cited by examiner

*Primary Examiner* — Antonio A Caschera
(74) *Attorney, Agent, or Firm* — Katherine Joanna Drakos; Micky Minhas

(57) ABSTRACT

Embodiments of the present disclosure relate to a remote desktop system which allows an application that executes on a remote computing device to be presented to a remote terminal as if the application is executing on the remote terminal. This system determines which of the remote computing device's application windows are top-level windows, and creates a rendering target for each top-level window. The rendering target is a graphics surface that is marshaled to the remote terminal. A PDU (Protocol Data Channel) is produced over this first graphics surface that includes a mapping of the location of the top-level window. A second graphics surface containing transparency information is created for a top-level window that contains a transparency characteristic. This second graphics surface is encoded and marshaled to the remote terminal separately from the first graphics surface. The client computing device receives and merges the two graphics surfaces, and renders a window with the expected transparency.

20 Claims, 9 Drawing Sheets

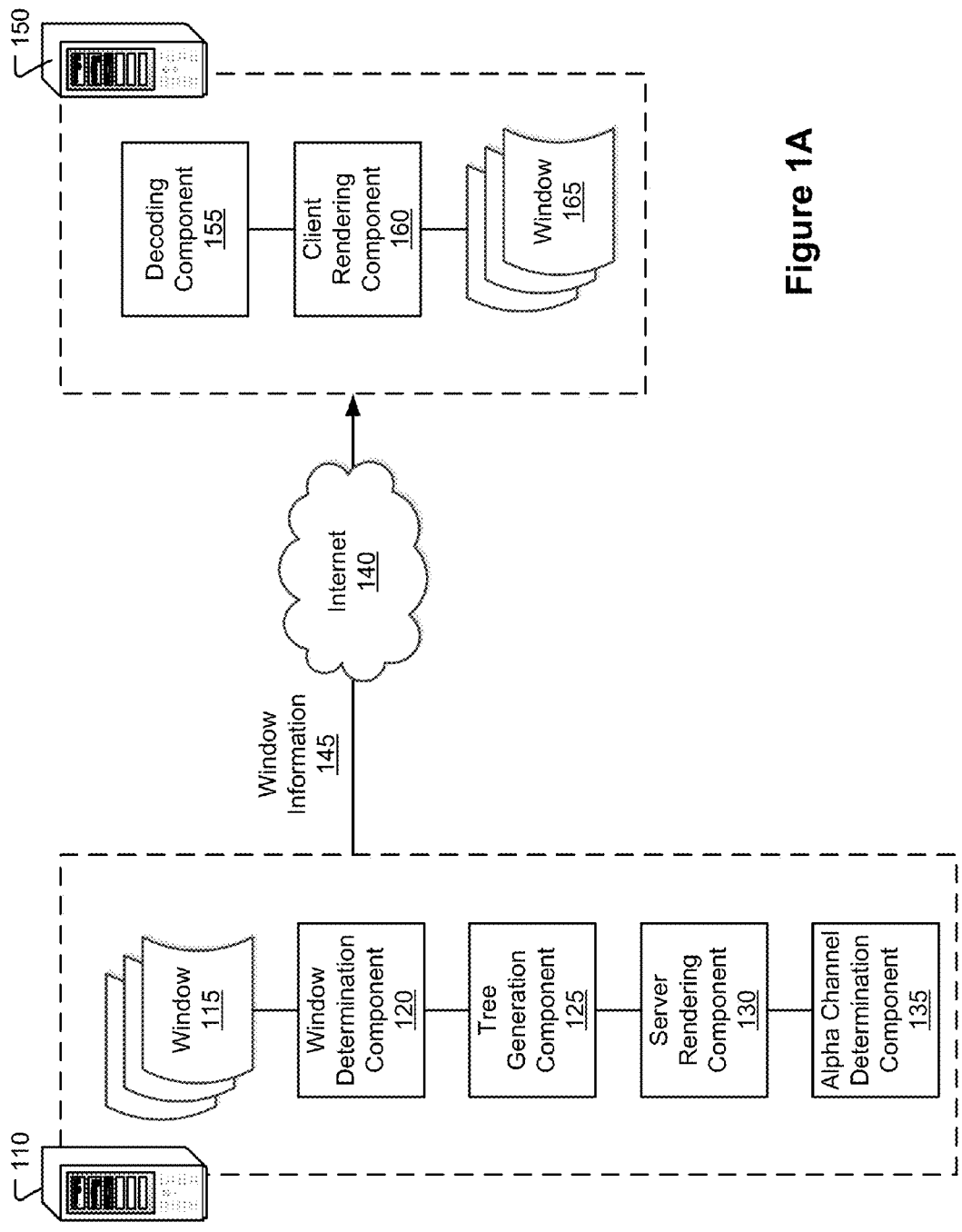

RENDERING WINDOWS HAVING TRANSPARENT PROPERTIES FROM A REMOTE DESKTOP ENVIRONMENT

CROSS-REFERENCE TO RELATED APPLICATIONS

This application is claims priority to U.S. provisional application Ser. No. 61/897,129, filed Oct. 29, 2013, entitled "RENDERING WINDOWS HAVING TRANSPARENT PROPERTIES FROM A REMOTE DESKTOP ENVIRONMENT," which application is incorporated herein by reference in its entirety.

BACKGROUND

Remote desktop systems allow a desktop environment of a computing device to be executed remotely on one system (e.g., a server computing device) while being displayed on a separate client computing device. The client computing device may display a copy of an image that is rendered on the server computing device. That copy may be refreshed on timed intervals or when a modification of the original image is detected. However, in some instances, the display characteristics of the server computing device may be different from those of the client computing device on which the copy of the image is rendered for a user. As such, the copy of the image rendered on the client computing device may not be displayed correctly.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

The present disclosure provides methods, systems, and computer products for providing transparency support for client-rendered windows in a remote desktop environment. Specifically, one or more embodiments provide for determining whether a window rendered on a server computing device is a top-level window. If it is determined that a window is a top-level window, a determination is made as to the sub-components of the top-level window and which, if any, of the sub-components possess a transparency characteristic. When at least one of the sub-components of the top-level window possesses a transparency characteristic, the sub-component possessing the transparency characteristic is encoded using a first encoding scheme. Additionally, the other sub-components that do not possess the transparency characteristic are encoded using a second encoding scheme. The sub-component that was encoded using the first encoding scheme and the sub-component that was encoded using the second encoding scheme are then transmitted to a client computing device.

In another embodiment, a determination is made as to which windows that are to be rendered on desktop of a server computing device are top-level windows. When at least one window is determined to be a top-level window, the top level window is associated with a particular surface. In some embodiments, the particular surface is unique to the top level window. A determination is then made as to the sub-components that make up the top-level window. Each sub-component of the top-level window is then rendered on the particular surface. Once rendered, a determination is made as to whether any of the sub-components of the window possess a transparency characteristic. When it is determined that one or more sub-components of the top-level window possess a transparency characteristic, the sub-component possessing the transparency characteristic is encoded using a first encoding scheme. The sub-components that do not possess the transparency characteristic are encoded using a second encoding scheme. Once the sub-components have been encoded using the different encoding schemes, the encoded sub-components of the top-level window are transmitted to a client computing device.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following Figures in which:

FIG. 1A illustrates a system for rendering windows in a remote desktop environment according to one or more embodiments of the present disclosure;

DETAILED DESCRIPTION

Figure 1B:
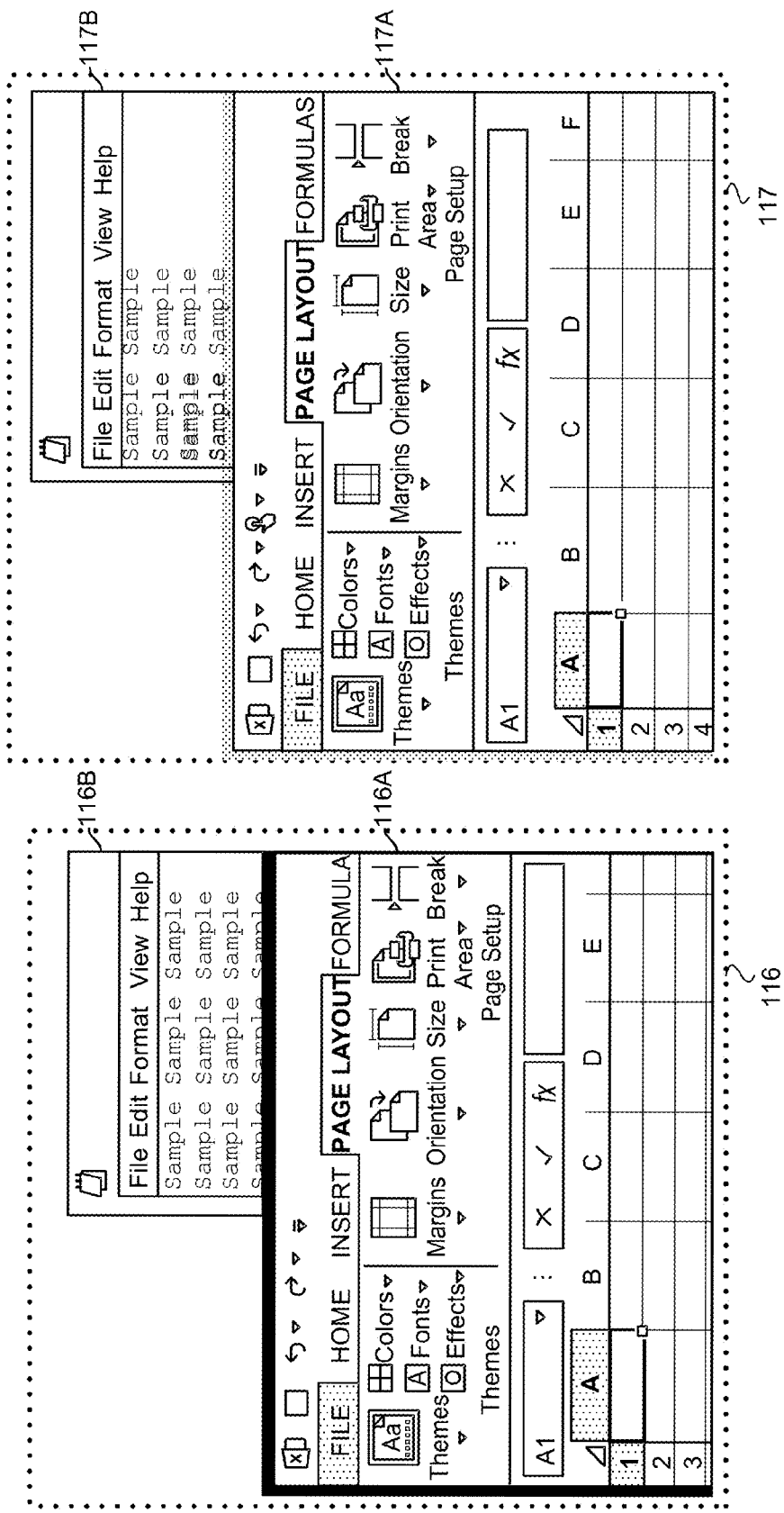
FIG. 1B illustrates obstructing windows with and without a transparency characteristic in a remote desktop environment.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

FIG. 1A illustrates a system 100 for rendering windows in a remote desktop environment according to one or more embodiments. As shown in FIG. 1, the system 100 may include a server computing device 110 and a client computing device 150. In certain embodiments, the server computing device 110 and the client computing device 150 may establish a communication session with each other over the Internet 140 or via some other form of communication. The communication session between the server computing device 110 and the client computing device 150 may be a remote desktop session. The remote desktop session may be established using Remote Desktop Services by MICROSOFT CORP. of Redmond, Wash. Additionally or alternatively, the communication session between the server computing device 110 and the client computing device 150 may be another remote based application whereby a local computing device can access data and render content that is being displayed on a remote computing device. One non-limiting example of such a program is the RemoteApp® by MICROSOFT CORP. of Redmond Wash. In other embodiments, however, other remote applications capable of displaying a remote desktop may be employed with the embodiments disclosed herein.

Such remote applications enable a user to access programs on a local device (e.g., a computer) that are being executed on a remote device using Remote Desktop Services. Remote application programs appear as if they are running on the end user's local computer. However, unlike typical remote desktop applications, in which applications or windows are presented to a user in the desktop of the Remote Desktop Session Host or server, the remote application program is integrated with the desktop of the local computer. As such, the remote application program may run in its own resizable window, it can be dragged between multiple monitors, and have its own entry in a taskbar. If more than one remote application program is running, each remote application program may share the same session.

Although FIG. 1A shows only one client computing device 150 and one server computing device 110, it is contemplated that system 100 may include additional servers and additional clients. For example, multiple clients may be able to connect to a single server, such as, for example server computing device 110. Likewise, a single client, such as, for example, client computing device 150 may be configured to connect to multiple servers.

In certain embodiments, the server computing device 110 may include a desktop on which one or more windows 115 are rendered or may be rendered. In certain embodiments, two or more windows 115 that are rendered on the desktop of the server computing device 110 may be arranged in a hierarchical structure, such as, for example, a tree. In certain embodiments, the desktop window of the server computing device 110 is the root node or root window and all other windows that are rendered or will be rendered is a child window of the root window.

As will be explained in detail below, a window may be comprised of various sub-components and each sub-component is akin to a node in particular window tree. For example, a window 115 may have a non-client portion (first node) and a client portion (second node) with each non-client portion having one or more sub-components (children of the first node) and each client portion having one or more sub-components (children of the second node). The non-client portion may include sub-components or features that a window may use regardless of the application running in the window. The sub-components of the non-client portion of the window may include, for example, a close button, a minimize button, a maximize button and the like. In embodiments, a sub-component may be any kind of graphical component. The client portion may include sub-components that are specific to the particular application. For example, if a word processing application is running in a particular window, the sub-components of the word processing application may include a text input area, a menu area, a border of a window and the like.

As briefly discussed above, each window 115 may be associated with a particular application. These applications may include a word processing application, a media player application, a browser application and the like. As discussed above, each program may be a RemoteApp® program executing on the server computing device 110. As such, a user of the client computing device 150 may interact with one or more windows 115 as if the application was installed on the client computing device 150.

As the server computing device 110 may have multiple windows open at a given time, it is possible that one or more windows may overlap each other. FIG. 1B illustrates such a scenario. In FIG. 1B, display 116 depicts the rendering of windows having transparency characteristics (e.g., a border of the window 116A is transparent or semi-transparent on the server computing device) using methods previously known in the art. On display 116, in which window 116B is partially obstructed by window 116A, the background color of the desktop of the server computing device is different from that of the client computing device. As such, the background color of the desktop of the server computing device affects the output of the transparent portion of the window 116A when it is rendered on the client computing device. For example, if the background color of the desktop of the server computing device 110 is black and the transparent portion of the window 115 is yellow, the black background color of the desktop of the server computing device 110 may be visible through the transparent portion of the window 115. Thus, the window is rendered on the client computing device 150 incorrectly.

Conversely, display 117 depicts the rendering of windows having transparency characteristics using methods disclosed in embodiments of the present application. On display 117, in which window 117B is partially obstructed by window 117A, the background color of the desktop of the server computing device is also different from that of the client computing device. However, as disclosed in more detail below, the background color of the desktop of the server computing device does not affect the output of the transparent portion of the window 117A when it is rendered on the client computing device.

While the embodiments illustrated in FIG. 1B show transparency characteristics for rectangular objects (e.g., windows) one of skill in the art will appreciate that the transparency characteristics may be applied to objects or windows having different types of shapes. For example, a circular clock may be displayed with transparency characteristics that may have circular non-transparent area. In another embodiment, a rectangular window may have a circular, triangular, polygonal, etc. transparency characteristic either around the window or in the middle of the window. One of skill in the art will appreciate that the embodiments disclosed herein may be practiced with any type of window or transparency area.

Referring back to FIG. 1A, in order to remedy these potential problems, the server computing device 110 comprises a window determination component 120 that is configured to determine which windows 115 that are rendered (or are to be rendered) on the desktop of the server computing device 110 are top-level windows. In embodiments, a top-level window is a window whose parent window is the desktop window (e.g., root window) of the server computing device 110. As will be discussed below, the desktop of the server computing device 110 comprises a number of surfaces and each top-level window has its own associated surface on which it is rendered. Thus, instead of the entire desktop, and each associated window, being rendered on the same surface, each window 115 of the present disclosure is rendered on a separate surface.

With this rendering method (e.g., windows rendered individually as opposed to rendering the entire desktop), the entirety of the bits of each window 115 are present at all times regardless of the order of the windows 115 on the desktop of the server computing device 110. In one embodiment, individually rendering each window 115 allows for compression optimizations. For example, each window 115 surface (discussed more below) may act like a cache, and any differencing-based compression algorithm may compare frames on a per-window basis. As such, only portions of the window that have changed will be compressed and transmitted to the client computing device 150.

In embodiments, once each top-level window is determined, a tree generation component 125 determines the sub-components (or nodes) of each top-level window. As discussed above, in embodiments, window 115 is comprised of one or more sub-components and each sub-component may be associated with metadata that indicates the properties of the sub-component. In certain embodiments, the metadata includes information regarding which portions, if any, of the particular sub-component have changed. As discussed above, the sub-components as a whole may make up the entire window. For example, a sub-component of a window may include a text input area, a menu, a pop-up, a video display area, a border, etc. One or more embodiments provide that a sub-component of a window may be comprised of one or more sub-windows (e.g., pop-up windows, dialog windows, chat windows etc.). However, as these sub-windows do not have the desktop window as their parent window, these sub-windows are not considered a top-level window. Thus, these sub-windows will be rendered and updated in the same manner as the other sub-components of the top-level window.

Once the sub-components of a top-level window is determined, a server rendering component 130 renders the window on a particular surface associated with the top level window of the server computing device 110. In embodiments, a surface is the rendering target to which a set of objects representing drawing instructions with associated graphical resources and spatial relationships, is rasterized. In embodiments, the desktop of the server computing device 110 includes many surfaces. In such embodiments, the surfaces may be virtual surfaces that are configured to host a particular top-level window. Although the virtual surfaces may be configured to host a particular top-level window, each top-level window may still be visible on the desktop of the server computing device 110.

As discussed above, each top-level window has associated sub-components that are organized in a hierarchical manner. Thus, instead of performing one single rendering pass starting from the root window of the desktop of the server computing device 100, the server rendering component 130 traverses each sub-tree associated with each top-level window and does a rendering pass for each sub-node. In response to the rendering pass, the window information of each sub-node is rendered on a surface associated with the respective parent top-level window (a surface distinct from the desktop surface of the server computing device 110.

Figure 2:
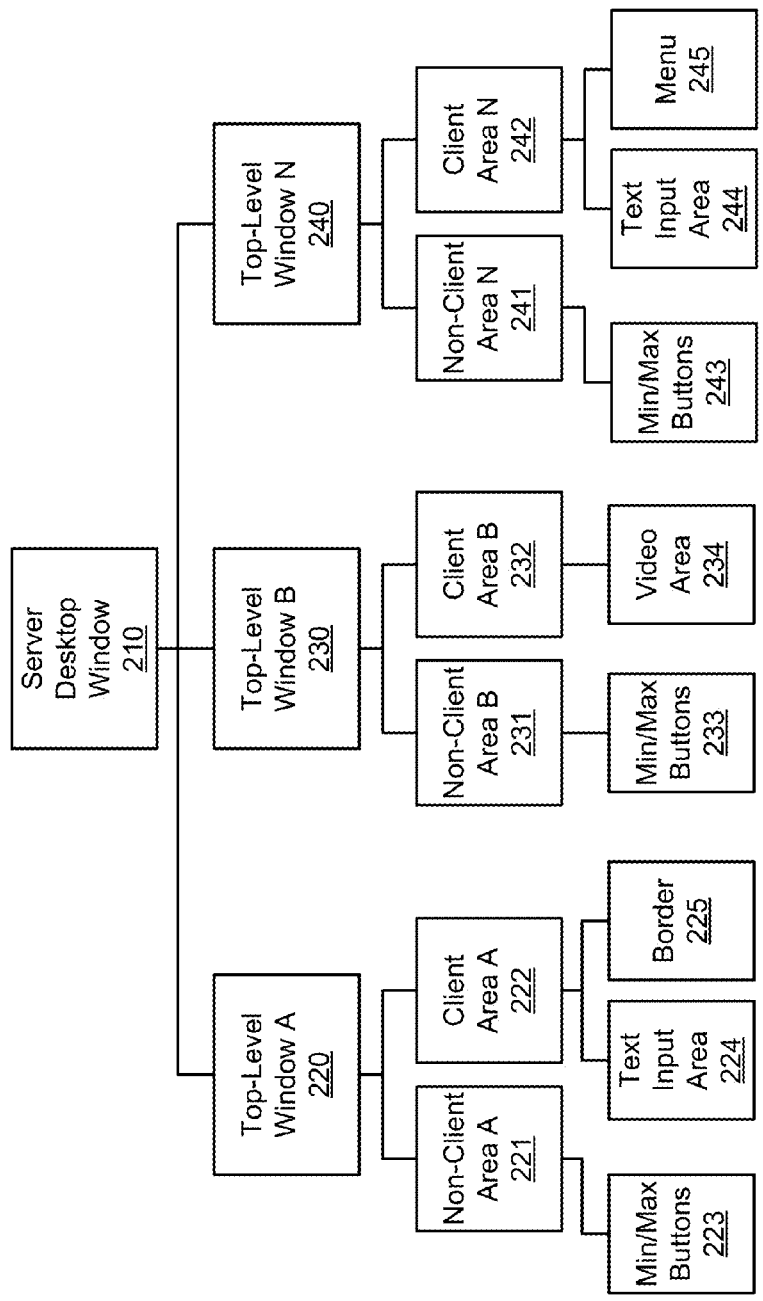
FIG. 2 illustrates a plurality of windows in a remote desktop environment as well as the sub-components associated with each window according to one or more embodiments of the present disclosure.

For example, FIG. 2 illustrates a remote desktop environment 200 in which a plurality of windows are rendered. As described above, each of the plurality of windows may be arranged in a hierarchical manner. For example, as shown in FIG. 2, the remote desktop may include a server desktop window 210 (e.g., a root window) and may also include a plurality of top-level windows (e.g., top-level window A 220, top-level window B 230, and top-level window N 240).

As described above, the top-level window A 220, the top-level window B 230, and the top-level window N 240 are defined as top-level windows because their parent window is the server desktop window 210. Although a specific number of top-level windows are shown, it is contemplated that a server desktop window 210 may have fewer or additional windows. Likewise, it is contemplated that each top-level window may have fewer or additional sub-components that make up the "sub-component tree" of each top-level window.

As also shown in FIG. 2, each top-level window includes one or more sub-components that are arranged in a hierarchal manner. For example, top-level window A 220 includes a non-client area A 221 child node and client area A 222 child node. As discussed above, a non-client area may include sub-components or features that a window may use regardless of the application running in the window. The sub-components of the non-client area of the window may include, for example, a close button, a minimize button, a maximize button and the like. A client area may include sub-components of a top-level window that are specific to the particular application. For example, if a word processing application is running in a particular window, the sub-components of the client area of the word processing application may include a text input area, a menu area, a border and the like.

In certain embodiments, each node in the tree may have one or more child nodes. For example, as shown in FIG. 2, non-client area A 221 has a min/max buttons 223 child node. Likewise, client area A 222 has a text input area 224 child node and a border 225 child node. In certain embodiments, one of the child nodes may be a sub-application or sub-window associated with the top-level window. However, as discussed above, because the sub-window or application does not have the server desktop window 210 as its parent window, the sub-window or application is rendered as part of the top-level window with which it is associated.

Likewise, top-level window B 230 includes various sub-components that make up the tree of top-level window B 230. For example, and as shown in FIG. 2, top level window B 230 includes a non-client area B 231 child node and client area A 232 child node. The non-client area B 231 node has a min/max buttons 233 child node and the client area B 232 node has a video area 234 node. As also shown in FIG. 2, top-level window N 240 also includes non-client area N 241 child node, a client area N 242 child node and sub-nodes min/max buttons 243, text input area 244 and menu 245 respectively.

As discussed above, each top-level window is associated with a particular surface. Thus, top-level window A 220 is associated with a first surface, top-level window B 230 is associated with a second surface and top-level window N 240 is associated with yet another surface. Thus, regardless of how the windows are arranged on the server desktop window 210, the windows may be rendered separately. Specifically, the methods and system described herein provide a rendering algorithm that traverses each sub-tree independently of all the other sub-trees. Thus, top-level window A 220 and its corresponding nodes are rendered in a first rendering pass, top level window B 230 is rendered in a second rendering pass etc. As each sub-tree is rendered separately on a given rendering pass, if something changes in one sub-tree, on that sub-tree (or a component or node of the sub-tree) is re-rendered and transmitted to the client computing device 150.

For example, if text-input area 224 has changed since the last rendering pass, one or more embodiments provide that only that sub-component associated with the text-input area 224 of the tree is re-rendered on the surface, encoded and sent to the client device. In another embodiment, if a particular sub-component of the tree has changed, the entire sub-tree (with the changed component at the root of the sub-tree) may be encoded and sent to the client device. Other embodiments provide that the sub-tree of the parent node of the changed node is encoded and sent to the client. Still yet other embodiments provide that either the entire tree or some other portion of the entire tree is sent to the client computing device in response to a determination that a sub-component of the tree has changed.

In certain embodiments, a position of a window, such as, for example, top-level window A 220 may be inconsequential. That is, when a window is moved, content within the window may not change—only the position of the window has changed. As a result, the entire window may not need to be encoded and transmitted to the server. Therefore, instead of destroying the surface on which the top-level window A 220 is rendered, generating a new surface and resending the pixels and tiles to a client device (which also changes the cache associated with the top-level window A 220) no additional client-side rendering may be necessary, as only a command indicating the new position of the window is sent to the client device.

Referring back to FIG. 1A, in certain embodiments, the server rendering component 130 is configured to make multiple rendering passes for each top level window. During each rendering pass, metadata associated with each window is analyzed by the server rendering component 130. This metadata includes information about which window or portions of the window have changed from frame to frame. This information may include frame start and stop information. The metadata may also include information regarding a particular window size or window position.

For example, a server computing device 110 may have two applications being executed in two different windows. The first application may be a media player application and the second application may be a word processing application. If a user types a word in the word processing application and content is being rendered in the media player application, in a given frame, both windows have changed. Accordingly, metadata associated with each window tracks the updates to each window and relates what content has changed by, for example, comparing the last rendered frame to the frame that is about to be rendered or is currently being rendered. When the change is determined, the sub-components associated with the changes are encoded and sent to the client computing device.

As also discussed above, each top-level window is associated with a particular surface. In certain embodiments, the bits of each surface are encoded and sent to the client computing device 150. These bits assist the client computing device 150 to know where the window is located with respect to the surface.

In certain embodiments, each surface may also include a padding of a particular size. The padding helps ensure that when a window is resized, the entire surface may not have to be destroyed, re-created and transmitted to the client device.

In certain embodiments, the padding is a 64-pixel padding. Thus, for example, if a window 115 rendered on the server computing device 110 is 64×64 pixels, the surface will be padded to 128×128 pixels. In one embodiment, this padding improves caching by reducing the amount of content that may be transmitted to the client. For example, if the size of the window 115 is reduced on the server computing device 110, the surface would not require resizing. Rather, the client computing device 150 would just need to retrieve fewer bits from the surface. Similarly, if the window 115 is increased to a size within the 64-pixel buffer (e.g., less that 128 pixels), the client device 150 would just need to retrieve additional bits from the transmitted surface in order to properly render the content. However, if the re-sized window exceeds the established padding, one or more embodiments provide that the surface on which the window was rendered is destroyed and a new surface is created. The newly re-sized window would then be rendered on the new surface. However, regardless of the size of the new window, one or more embodiments provide that the new window also has the given padding.

Although a padding of 64 pixels is specifically mentioned, it is contemplated that other padding sizes may be established. For example, the padding could be made using multiples of 64. Thus for example, if a window was 65 pixels by 65 pixels, the area of the surface, including the padding, would be 128 pixels by 128 pixels. In another embodiment, a range of pixel padding may be established based on the current size of the window.

In certain embodiments, a window 115, or portions of the window 115, may possess a transparency characteristic. This transparency characteristic may correspond to the shading or coloring of a border of an application that is executing on the desktop of the server computing device 110. In a remote desktop session, when a transparent window is rendered, that portion of the window may be blended with the rest of the desktop. As such, the transparent characteristic may become flawed during rendering on the client computing device 150. As such, the raw blending information of the transparent portion of the window 115 needs to be determined and sent to the client computing device 150.

Accordingly, the server computing device 110 includes an alpha channel determination component 135 that determines the alpha values of the transparent portion of a top-level window. An alpha value, for example, specifies how the rendering of a grouping of related graphical objects that may contain a stream of drawing instructions is to be blended with the background. For example, as the server rendering component 130 traverses each tree associated with each top-level window, the server rendering component 130 determines whether a particular sub-component includes a transparency characteristic. This transparency determination may be made by evaluating, for example, the flags in the window 115 properties that indicate the presence of alpha values. In another embodiment, the transparency determination may be made by analyzing the alpha component of the rendered pixels directly.

Specifically, one or more embodiments provide that when one of the windows is rendered on the desktop of the server computing device 110, the determined alpha value is applied to that rendering. In certain embodiments, the alpha values are drawn by initializing the surface associated with the window to transparent black. Thus, anything that is not rendered by the window itself will end up being transparent on the client. As each top-level window is rendered separately on a different surface, the alpha value information can be re-blended on the desktop of the client computing device 150 without including pieces of windows that may have been overlapping with the window on the desktop of the server computing device 110.

As mentioned above, if a top-level window possesses a transparency characteristic, the bit values for that window are represented in a bitmap format that may be used with alpha values (e.g., ARGB, ARBGY). If a top-level window does not possesses a transparency characteristic, the bit values for that window are represented in a bitmap format that does not allow alpha values (e.g., XRGB, RGBY). Although specific bitmap formats are described herein, it is to be understood that alternate bitmap formats are contemplated. In order for the top-level window to be rendered correctly on the client computing device, both the RGB values and the alpha values need to be transmitted to the client. Accordingly, one or more embodiments provide that one or more codecs are used to transmit the RGB values to a client computing device 150, and then the alpha values are sent to the client computing device 150 using another codec implementing alpha channel support (hereinafter referred to as an "alpha codec"). The codec described herein may have only encoding functionality, only decoding functionality, or may have both encoding and decoding functionality.

In embodiments, an alpha codec, is a device or computer program capable of encoding and decoding data in an alpha channel. The alpha codec may apply algorithms for combining the alpha channel with content (e.g., H.264, MPEG-4, Dirac content) that allows the client to render semi-transparent video playback or other semi-transparent content. For content that does not have a transparency characteristic, that content may be encoded with a RGB codec. An RGB codec, for example, is a device or computer program capable of encoding and decoding data associated with colored pixels. In one embodiment, this separation of codecs increases the efficiency of the encoding process (e.g., making it easier to perform decoding of h264 content by client devices) by ensuring that a specifically-tuned codec is used on a corresponding surface.

In some embodiments, the RGB encoded values and the alpha encoded values are transmitted to the client computing device 150 separately. In another embodiment, each of the codecs is sent simultaneously or substantially simultaneously. In embodiments where the alpha values do not change from frame to frame or if there no alpha values are present, an alpha codec may not be sent to the client computing device 150.

For example, if a sub-component of a window possesses a transparency characteristic on the server side, the alpha values are encoded and transmitted to the client device. In one embodiment, an alpha flag may be used to indicate that a sub-component of a window possesses a transparency characteristic. An alpha flag, for example, refers to one or more bits that are used to store a binary value or code that that is assigned to the presence of alpha values. In another embodiment, the alpha values themselves are analyzed to determine if a portion of the window is transparent. If the alpha values are all 0xFF the window is determined to be a solid window and alpha values do not need to be sent to the client computing device 150.

Once the alpha values and RGB values have been determined, this window information 145 is transmitted from the server computing device 110 to the client computing device 150. Once the window information is received, the client computing device 150 utilizes a decoding component 155 to decode the encoded surfaces into one or more windows 165. Once decoded, a client rendering component 160 analyzes the mapping information to determine the placement of the window on a surface as well as one or more sub-components of the window. If the decoding component detects a transparency characteristic, the client rendering component 160 generates a user interface element optimized for transparent content and blends the alpha value with the RGB value. However, if no transparency characteristic is detected, a regular opaque window is generated using the received RGB values.

Figure 3:
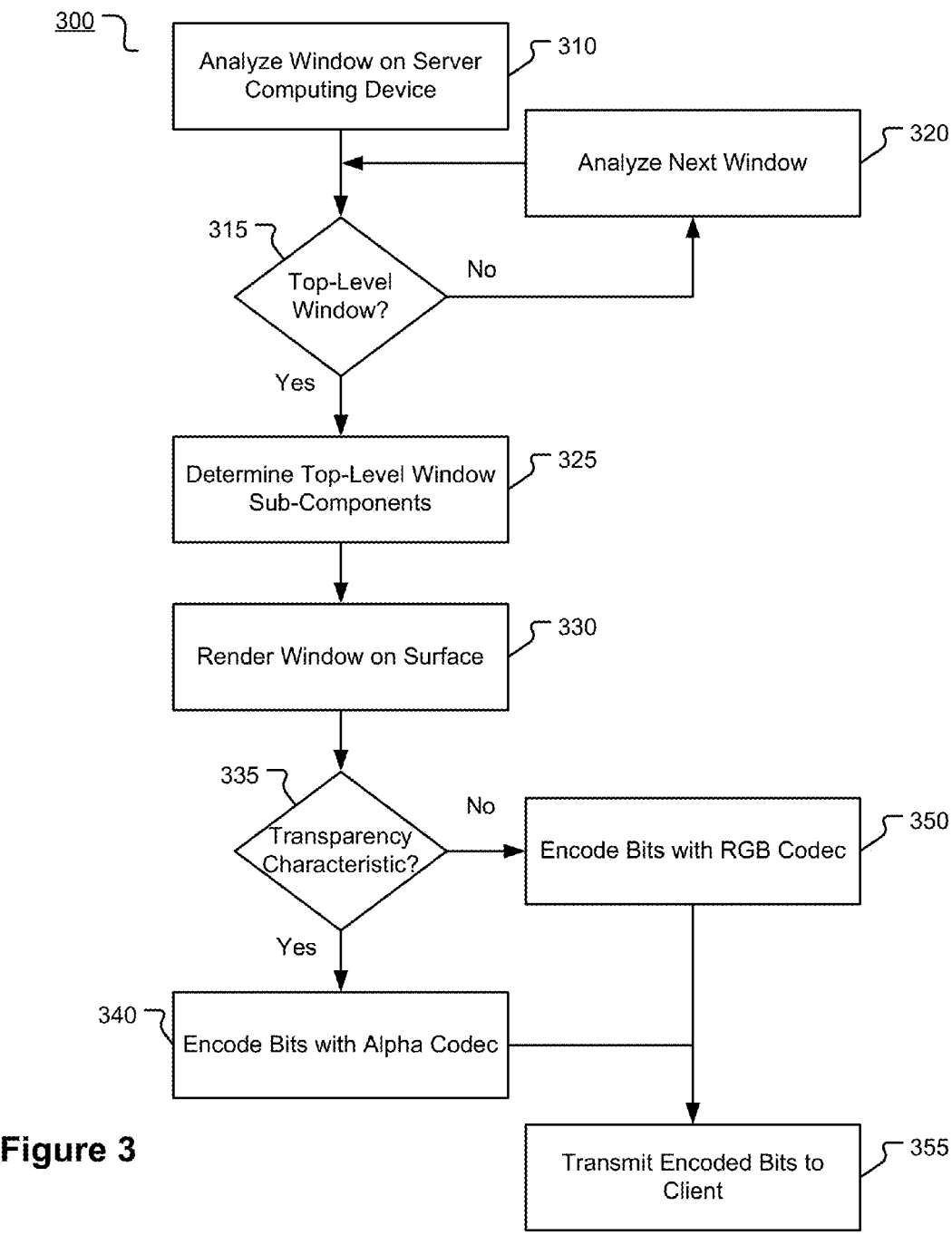
FIG. 3 illustrates a method for transmitting window data in a remote desktop environment from a server computing device to a client computing device according to one or more embodiments of the present disclosure.

FIG. 3 illustrates a method 300 for transmitting window data in a remote desktop environment from a server computing device to a client computing device according to one or more embodiments. In certain embodiments, the method 300 may be performed by one or more components of FIG. 1A. For example, the server computing device may be server computing device 110 of FIG. 1A and the client computing device may be the client computing device 150 of FIG. 1A.

Referring to FIG. 3, method 300 begins when a determination 310 is made as to whether a window that is to be rendered, or whether a window that is currently rendered, on a server computing device is a top-level window. In certain embodiments, the window to be analyzed may be window 115 (FIG. 1A). In embodiments, each window includes one or more sub-components that are organized into a hierarchical structure. Likewise, each window that is rendered or is going to be rendered is also part of a window tree. In certain embodiments, the window tree includes a root node (e.g., desktop window of the server computing device) and one or more child nodes (e.g., the one or more top-level windows).

Once a window is analyzed, flow proceeds to operation 315 in which a determination is made as to whether the analyzed window is a top-level window. If the window is not a top-level window, flow proceeds to operation 320 and a new window is selected for analysis. The process then flows back to operation 315 and a determination is made as to whether the new window is a top-level window.

If it is determined in operation 315 that the analyzed window is a top-level window, flow proceeds to operation 325 and one or more sub-components of the top-level window are determined. In certain embodiments, operation 325 may be performed by a window determination component, such as, for example, window determination component 120 (FIG. 1A). In embodiments, each sub-component is a child node of the top-level window. Further, each sub-component may have one or more child sub-components. For example, as shown in FIG. 2, the top level window A 220 is a child node of the server desktop window 210. Additionally, the top-level window A 220 has two child nodes: non-client area A 221 child node and client area A 222 child node. As also shown in FIG. 2, non-client area A 221 has a child node min/max buttons 223 and client area A 222 has two child nodes: text input area 224 and border 225. In embodiments, the collection of each of the sub-components or nodes comprises the entire window.

Once the sub-components of the top-level window are determined, flow proceeds to operation 330 in which the top-level window is rendered on a surface. In certain embodiments, each top level window is rendered on a surface using a server rendering component 130 (FIG. 1A).

In embodiments, each top-level window is rendered on an individual surface, which may be a logical entity that represents the pixels corresponding to one or more windows. In other embodiments, one or more top-level windows are rendered on the same surface. In such embodiments, portions of the surface are identified as different windows. The portions may be identified by their location on the surface (e.g., location on the screen, pixel location, etc.). As described above, the surface may include a padding of a particular size or number of pixels. Padding assists with caching, but also allows the compression of data with algorithms and facilities that requires a specific alignment for encoding and decoding (e.g., Streaming SIMD Extensions "SSE" instructions). In certain embodiments, the padding enables the rendered window to be resized (at least up to the dimensions of the surface plus the padding) without requiring the surface to be destroyed, re-created and transmitted to the client computing device. However, if the re-sized window exceeds the pixel limit of the surface (including the padding), the old surface is destroyed, a new one is created and the new surface (including a new padding associated with the newly created surface) is transmitted to a client computing device.

As the window is being rendered on the surface, one or more embodiments provide that a determination 335 is made as to whether one or more subcomponents of the window include a transparency characteristic. For example, as each top-level window tree is traversed to determine whether one or more sub-components of a tree have changed, a determination may also be made as to whether a particular sub-component possesses a transparency characteristic. If a transparency characteristic is detected, flow proceeds to operation 340 in which transparency bits are encoded using an alpha codec (e.g., encoded with an alpha value). In some embodiments, the alpha codec may produce encoded transparency values separate from the other sub-components. Flow then proceeds to operation 350 in which the other sub-components of the top-level window are encoded using an RGB codec. The encoded bits are sent 335 to the client device.

In an alternate embodiment, operation 350 may be performed prior to the decision at operation 335. In such embodiments, the sub-components are always encoded with an alpha value. For example, all encoding at operation 350 may be performed using ARGB (e.g., an RGB format that includes an alpha value). In such embodiments, after encoding using ARGB, decision operation 335 may still determine whether one or more subcomponent of the window include a transparency characteristic. If a transparency characteristic is included, the ARGB values may be sent to the client. If a transparency value is not encoded, the alpha value from the ARGB value may be stripped and only the RGB value may be sent to the client. In such embodiments, the same encoding process may be performed regardless of whether a transparency characteristic exists. This allows for static encoding and thereby saves resources associated with using different codecs. Additionally, this allows a server to transmit the encoding to multiple clients who may or may not support alpha characteristics using the same encoding for the non-transparency values.

In yet another embodiment, multiple different codecs may be used by server. For example, two or more different RGB codecs may be used to encode the bits. In such embodiments, all of the different codecs may provide alpha support, none of the different codecs may provide alpha support, or some of the codecs may provide alpha support while others may not. In such embodiments, different windows may be encoded using the different codecs (e.g., using disparate RGB codecs). Additionally, an alpha codec may be used to encode one or both of the different videos. In such embodiments, the server may send the different encodings to different clients based on the RGB codec that the client supports.

In certain embodiments, if a transparency characteristic is not detected, flow proceeds directly to operation 350 and one or more sub-components of the top-level window are encoded using an RGB codec. The RGB codec is then transmitted 355 to the client device. In certain embodiments, each encoded graphics surface is separately transmitted to the client device. In another embodiment, each of the encoded graphics is sent simultaneously or substantially simultaneously. In yet another embodiment, the encoded values may be sent to the client only if the client indicates the ability to decode the encoded values. In such embodiments, encoded transparency values may only be sent if the client indicates the ability to decode encoded transparency values. Additionally, a client indicating the ability to decode encoded transparency values may only be sent the values if the client also indicates an interest in receiving the encoded transparency values. In other embodiments, the encoded values may be sent to the client if a client indicates an interest in receiving the encoded transparency values, regardless of whether the client indicates the ability to decode encoded transparency values. In certain embodiments, the encoded values may be sent to the client unless the client indicates the inability to decode encoded transparency values or a lack of interest in receiving the decoded encoded transparency values.

Figure 4:
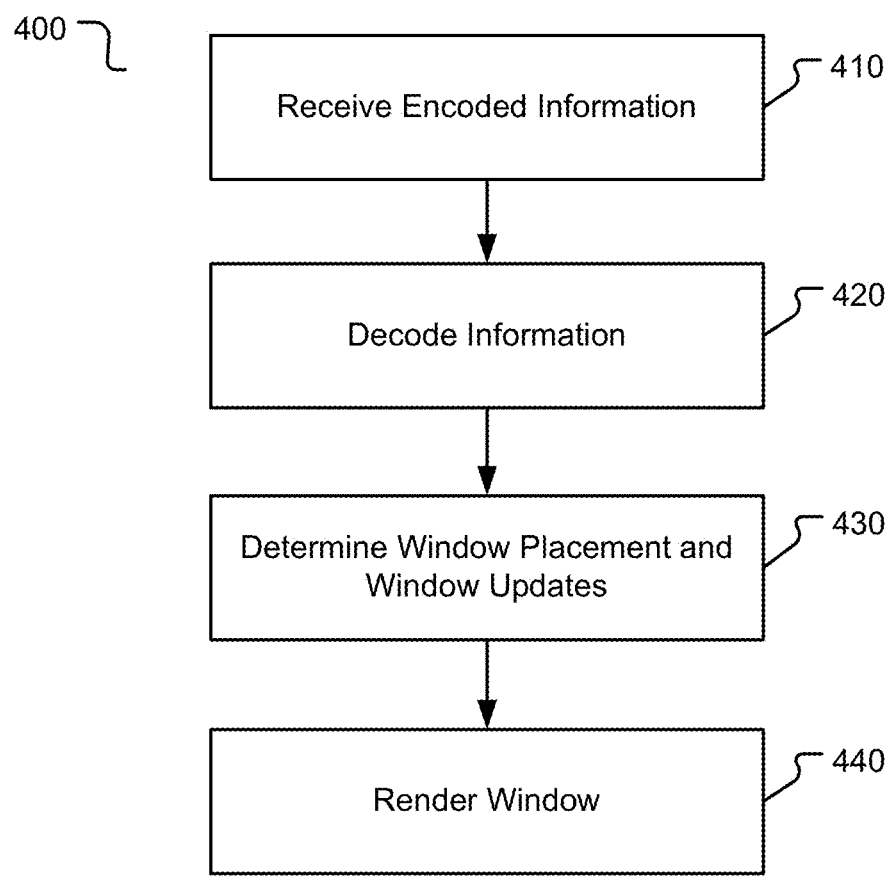
FIG. 4 illustrates a method of rendering a remote desktop window on a client computing device according to one or more embodiments of the present disclosure.

FIG. 4 illustrates a method 400 of rendering a remote desktop window on a client computing device according to one or more embodiments. Method 400 begins when encoded information is received 410 at the client computing device. As discussed above, the encoded information may include information corresponding to an alpha codec and information corresponding to a RGB codec. Additionally or alternatively, the information may include information corresponding to a particular surface on which a window has been rendered.

Once the encoded information has been received, flow proceeds to operation 420 in which the received information is decoded. In embodiments, the information is decoded using a decoding component of the client computing device such as, for example, decoding component 155 (FIG. 1A). In certain embodiments, the decoding component may be configured to decode both a RGB codec and an alpha codec. In other embodiments, the decoding component can ignore the alpha codec and only decode using the RGB codec. In yet another embodiment, the decoding component can first use the RGB codec to decode a component and then apply the alpha component.

Once the information has been decoded, flow proceeds to operation 430 in which the window information is evaluated to determine window placement and window updates. For example, if a window has moved on the desktop of the server computing device, that change may be transmitted to the client computing device. Likewise, if content has been updated, the changes to the sub-components of the window are transmitted and received by the client computing device. In embodiments, the changes to each sub-component may be relayed as encoded information received at operation 410.

Flow then proceeds to operation 440 in which the window is rendered on the client device. In certain embodiments, a rendering component, such as, for example, client rendering component 160 (FIG. 1A) evaluates each received surface to determine whether transparency information has been included with the data. If transparency information is not detected, a standard RGB window is rendered. However, if transparency information is detected in the surface, the rendering component generates a layered window and applies the transparency characteristic to the layered window.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
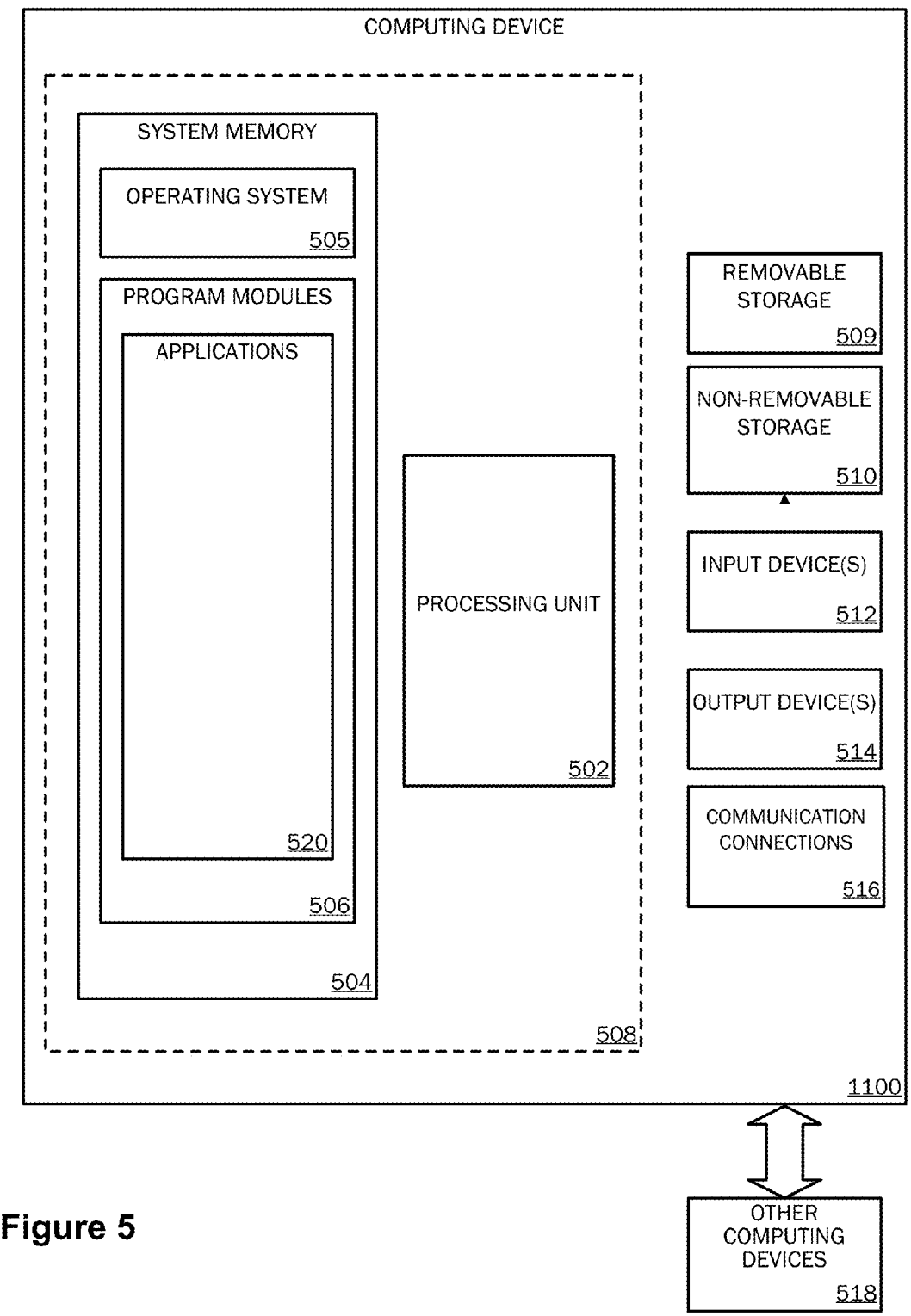
FIG. 5 is a block diagram illustrating example physical components of a computing device that may be used with one or more embodiments of the present disclosure.
Figure 6A:
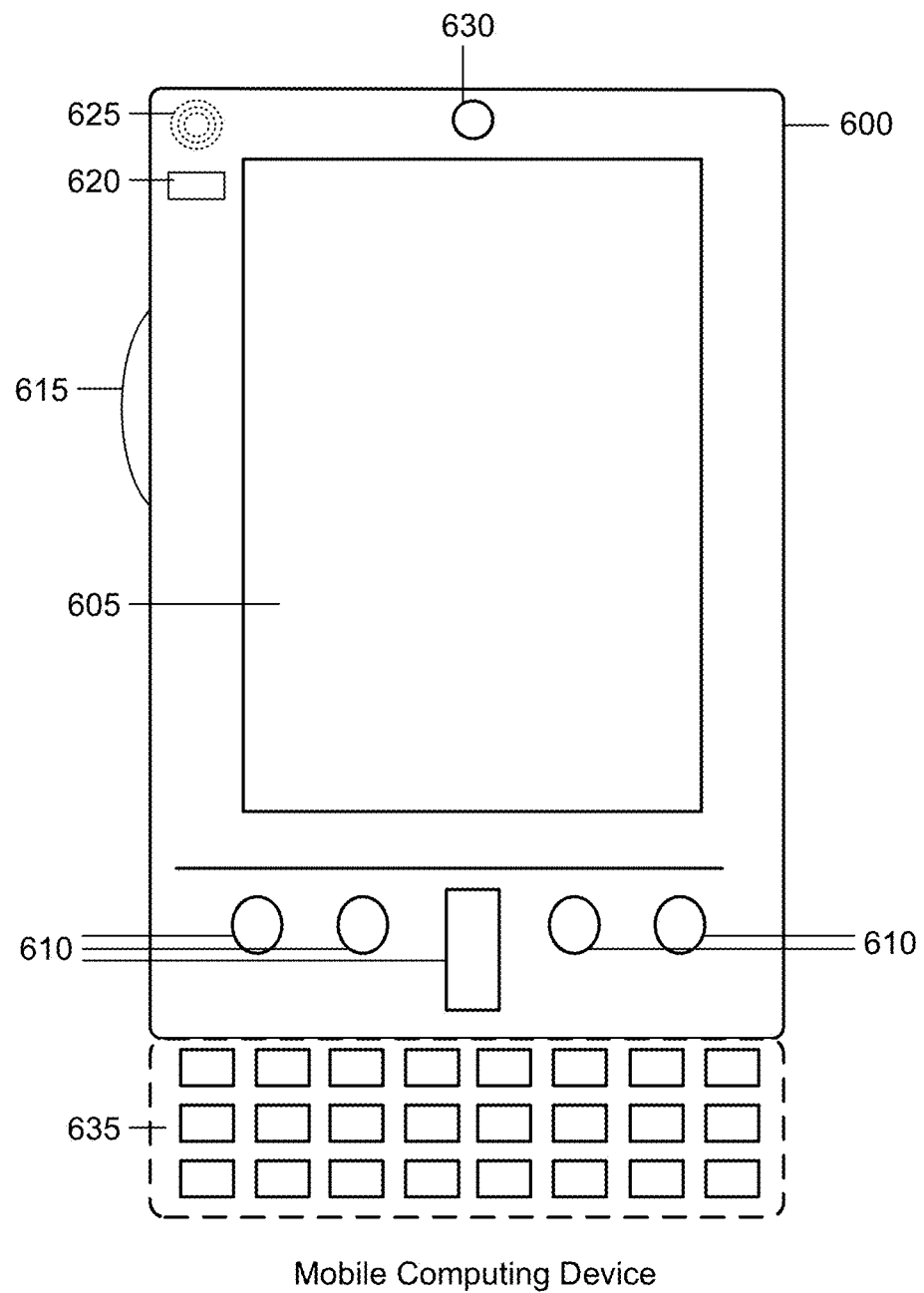
FIGS. 6A and 6B are simplified block diagrams of a mobile computing device that may be used with one or more embodiments of the present disclosure.
Figure 6B:
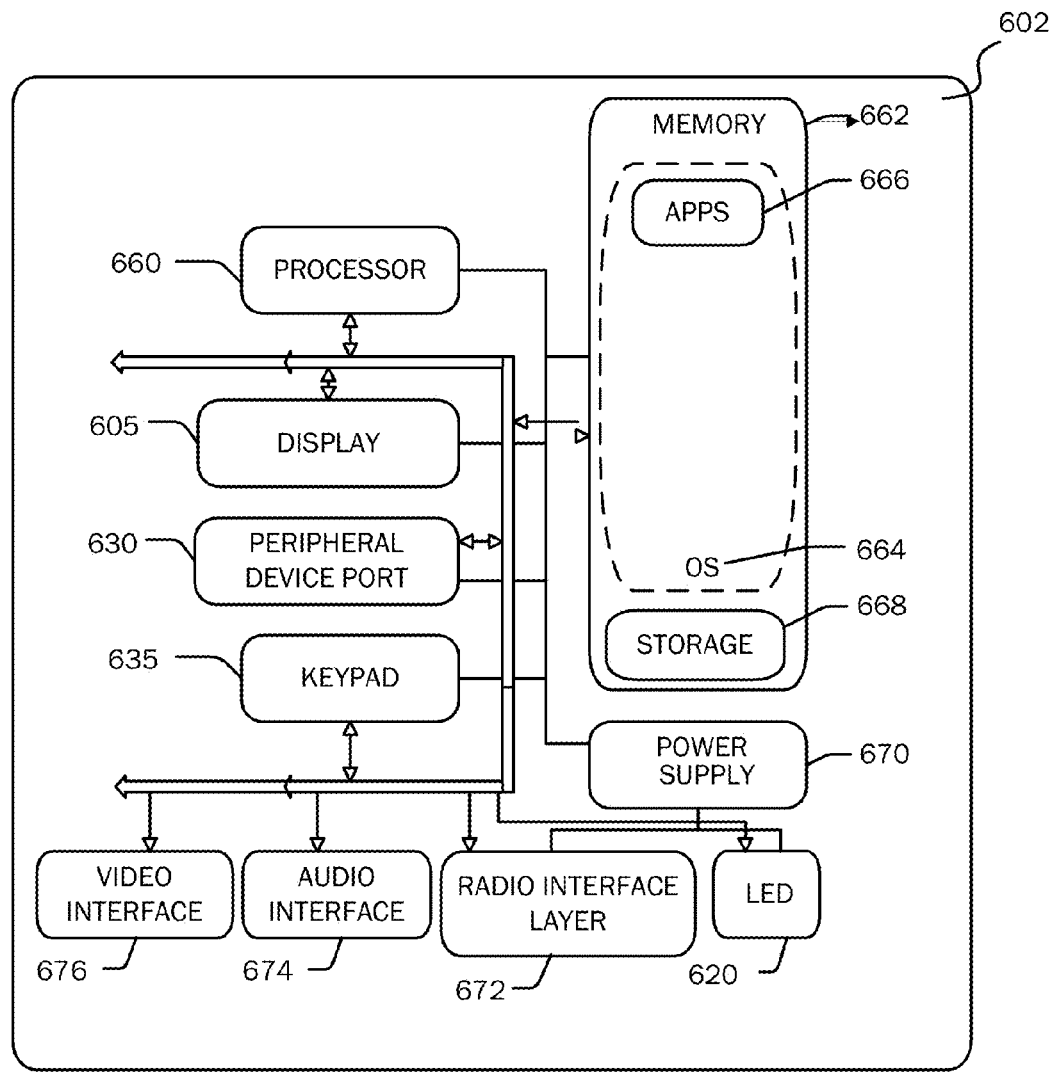
Figure 7:
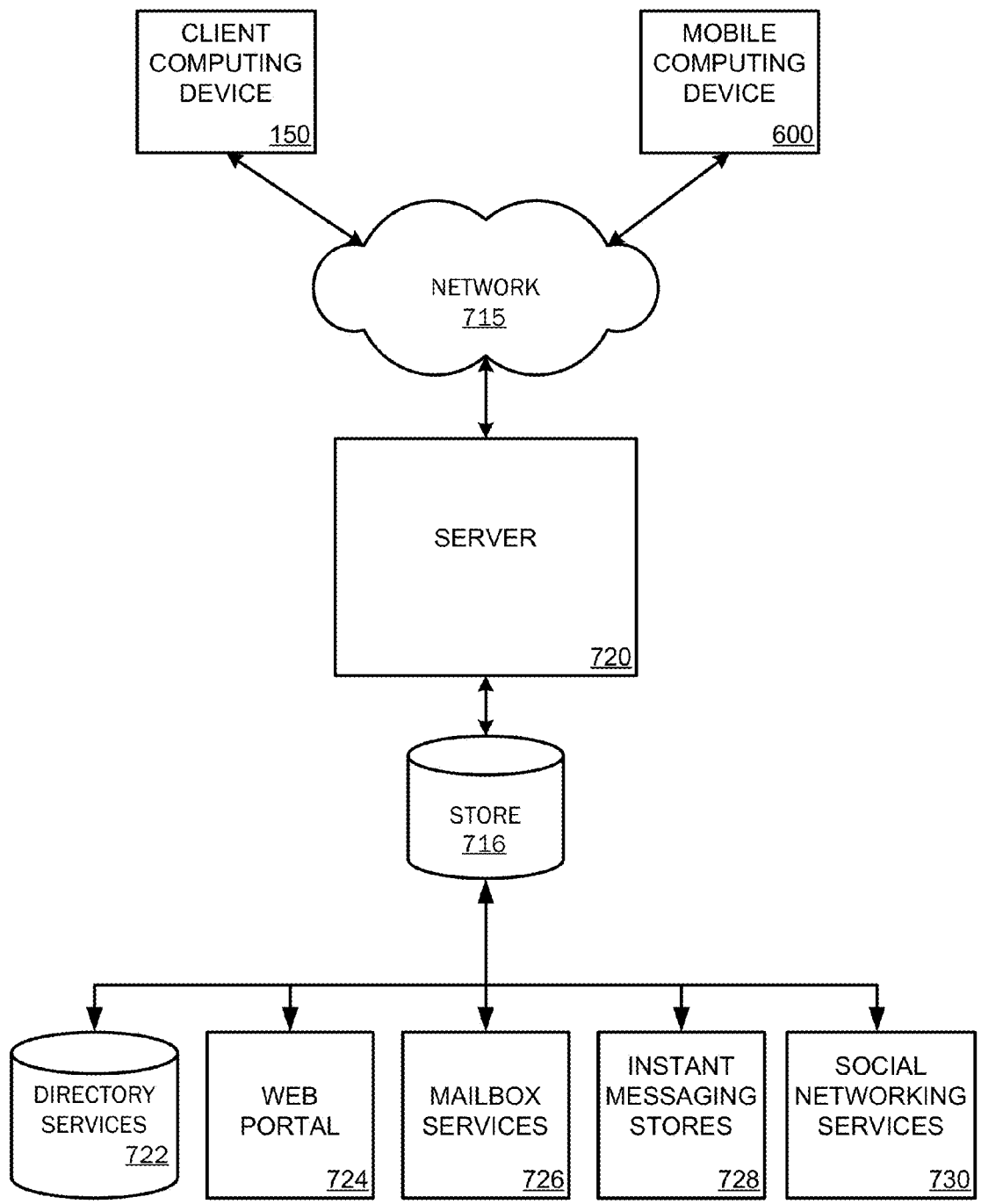
FIG. 7 is a simplified block diagram of a distributed computing system that may be used with one or more embodiments of the present disclosure.

FIGS. 5-7 and the associated descriptions provide a discussion of a variety of operating environments in which embodiments of the present disclosure may be practiced. However, the devices and systems illustrated and discussed with respect to FIGS. 5-7 are for purposes of example and illustration and are not limiting of a vast number of computing device configurations that may be utilized for practicing embodiments described herein.

FIG. 5 is a block diagram illustrating physical components (i.e., hardware) of a computing device 1100 with which embodiments of the present disclosure may be practiced. The computing device components described below may be suitable for the computing devices described above including the server computing device 110 and the client computing device 150. In a basic configuration, the computing device 1100 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as those supported by remote application programs described herein. The operating system 505, for example, may be suitable for controlling the operation of the computing device 1100. Furthermore, embodiments of the present disclosure may be practiced in conjunction with a graphics library, other operating systems, or any other application program and is not limited to any particular application or system. This basic configuration is illustrated in FIG. 5 by those components within a dashed line 508. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the methods 300 and 400 illustrated in FIGS. 3-4. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 1100 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 1100 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 1100 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which embodiments of the present disclosure may be practiced. With reference to FIG. 6A, one embodiment of a mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for transferring data between different computing devices as described above. The data transferred between client computing device 150 and the server computing device 110 may be stored in different communication channels or other storage types. For example, various documents may be stored using a directory service 722, a web portal 724, a mailbox service 726, an instant messaging store 728, or a social networking site 730. A server 720 may provide data to and from client computing device 150. As one example, the server 720 may be a web server. The server 720 may provide data to client computing device 150 or mobile computing device 600 over the web through a network 715. By way of example, the Node A 110 or Node B 115 may be embodied in a personal computer, a tablet computing device and/or a mobile computing device 600 (e.g., a smart phone). Any of these embodiments may obtain content from the store 716.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

We claim:

1. A method for rendering a window in a remote desktop session between a server computing device and a client computing device, the method comprising:
    determining a window rendered on the server computing device is a top-level window;
    determining one or more sub-components of the top-level window;
    determining the one or more sub-components of the top-level window possesses a transparency characteristic; and
    when the one or more sub-components of the top-level window possesses a transparency characteristic:
        encoding the one or more sub-components of the top-level window possessing the transparency characteristic using a first encoding scheme;
        encoding one or more other sub-components of the top-level window not possessing the transparency characteristic; and
        transmitting the encoded one or more sub-components of the top-level window possessing the transparency characteristic and the encoded one or more sub-components of the top-level window not possessing the transparency characteristic to the client computing device.

2. The method of claim 1, wherein the first encoding scheme is an alpha codec encoding scheme and wherein the individual graphics surface comprises padding data, wherein the padding data stores information for at least a portion of the top-level window, further comprising:
    determining whether one or more sub-components of the top-level window have changed between a first rendering pass and a second rendering pass; and
    not transmitting, on a screen refresh, the unchanged one or more sub-components of the top-level window when it is determined that one or more sub-components of the top-level window have changed.

3. The method of claim 1, wherein the top-level window is rendered on an individual graphics surface.

4. The method of claim 3, wherein the individual graphics surface comprises padding data, wherein the padding data stores information for at least a portion of the top-level window.

5. The method of claim 1, wherein at least one of the one or more sub-components are encoded using a second encoding scheme.

6. The method of claim 1, wherein the top-level window comprises at least one of a client portion and a non-client portion.

7. The method of claim 1, wherein the first encoding scheme is an alpha codec encoding scheme.

8. The method of claim 1, wherein at least one of the one or more sub-components comprises metadata information corresponding to at least one of: (i) frame start and stop information; or (ii) window information.

9. The method of claim 1 further comprising determining whether one or more sub-components of the top-level window have changed between a first rendering pass and a second rendering pass.

10. The method of claim 9, further comprising transmitting the changed one or more sub-components of the top-level window when it is determined that one or more sub-components of the top-level window have changed.

11. A computer-readable storage medium encoding computer executable instructions which, when executed by at least one processor, performs a method for rendering a window in a remote desktop session between a server computing device and a client computing device, the method comprising:

determining whether a window rendered on the server computing device is a top-level window;

determining one or more sub-components of the top-level window;

determining whether the one or more sub-components of the top-level window possesses a transparency characteristic; and when the one or more sub-components of the top-level window possesses a transparency characteristic:

encoding the one or more sub-components of the top-level window possessing the transparency characteristic using a first encoding scheme;

encoding one or more other sub-components of the top-level window not possessing the transparency characteristic using a second encoding scheme; and transmitting the encoded one or more sub-components of the top-level window possessing the transparency characteristic and the encoded one or more sub-components of the top-level window not possessing the transparency characteristic to the client computing device.

12. The computer-readable storage medium of claim 11, wherein the top-level window is rendered on an individual graphics surface.

13. The computer-readable storage medium of claim 12, wherein the individual graphics surface comprises padding, wherein the padding data stores information for at least a portion of the top-level window.

14. The computer-readable storage medium of claim 13, wherein the individual graphics surface is associated with one or more bitmaps.

15. The computer-readable storage medium of claim 11, wherein the top-level window comprises at least one of a client portion and a non-client portion.

16. The computer-readable storage medium of claim 11, wherein the first encoding scheme is an alpha codec encoding scheme.

17. A system comprising:

one or more processors; and a memory coupled to the one or more processors, the memory for storing instructions which, when executed by the one or more processors, performs a method for rendering a window in a remote desktop session between a server computing device and a client computing device, the method comprising:

determining a window to be rendered on the server computing device is a top-level window;

when the window to be rendered on the server computing device is a top-level window:

associating the top-level window with a particular surface;

determining one or more sub-components of the top-level window;

rendering each sub-component of the top-level window on the particular surface;

determining the one or more sub-components of the top-level window possesses a transparency characteristic; and when the one or more sub-components of the top-level window possesses a transparency characteristic:

encoding the one or more sub-components of the top-level window possessing the transparency characteristic using an alpha channel codec;

encoding one or more other sub-components of the top-level window not possessing the transparency characteristic using a non-alpha channel codec; and transmitting the encoded one or more sub-components of the top-level window possessing the transparency characteristic and the encoded one or more sub-components of the top-level window not possessing the transparency characteristic to the client computing device.

18. The system of claim 17, wherein the particular surface comprises a plurality of top-level windows.

19. The system of claim 17, further comprising instructions for:

determining whether metadata associated with the one or more sub-components of the top-level window has changed in a subsequent rendering pass; and transmitting the metadata to the client computing device.

20. The system of claim 17, further reciting:

transmitting the encoded one or more sub-components of the top-level window not possessing the transparency characteristic to a second client computing device without transmitting the encoded one or more sub-components of the top-level window possessing the transparency characteristic to the second computing device, based on at least one indication selected from the group consisting of: (i) an indication that the first client computing device supports decoding transparency; (ii) an indication that the first client computing device wants to receive transparency information; (iii) an indication that the second client computing device does not support decoding transparency; or (iv) an indication that the second client computing device does not want to receive transparency information.

* * * * *